US012512084B2

(12) United States Patent
Nakagoshi et al.

(10) Patent No.: US 12,512,084 B2

(45) Date of Patent: Dec. 30, 2025

(54) SOUND DEVICE, PROGRAM, AND CONTROL METHOD

(71) Applicant: AlphaTheta Corporation, Yokohama (JP)

(72) Inventors: Tatsuya Nakagoshi, Yokohama (JP); Hisashi Kokawa, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 161 days.

(21) Appl. No.: 18/563,654

(22) PCT Filed: May 27, 2021

(86) PCT No.: PCT/JP2021/020240

§ 371 (c)(1),
(2) Date: Nov. 22, 2023

(87) PCT Pub. No.: WO2022/249403

PCT Pub. Date: Dec. 1, 2022

(65) Prior Publication Data

US 2024/0249706 A1 Jul. 25, 2024

(51) Int. Cl.
*G10H 1/00* (2006.01)

(52) U.S. Cl.
CPC ..... *G10H 1/0008* (2013.01); *G10H 2210/056* (2013.01); *G10H 2220/101* (2013.01)

(58) Field of Classification Search
CPC ............................. G06F 3/165; G10H 1/0008; G10H 2210/056; G10H 2220/101
See application file for complete search history.

(56) References Cited

U.S. PATENT DOCUMENTS

| | | | | |
|---|---|---|---|---|
| 10,887,033 | B1 * | 1/2021 | Tessmann et al. | G06F 3/165 |
| 2011/0015767 | A1 | 1/2011 | Homburg et al. | |
| 2021/0326102 | A1 * | 10/2021 | Morsy et al. | G06F 3/165 |

FOREIGN PATENT DOCUMENTS

| | | | |
|---|---|---|---|
| JP | 2002-229574 | A | 8/2002 |
| JP | 2003-084763 | A | 3/2003 |
| JP | 2014-149488 | A | 8/2014 |

OTHER PUBLICATIONS

"Spleeter by Deezer: Open-sourcing a Machine-Learning Music Source Separation Software", pp. 1-7, Khlif, Anis and Voituret, Félix, Feb. 2, 2020, video link: https://video.fosdem.org/2020/UB2.147/om_spleeter.webm (Year: 2020).*

(Continued)

*Primary Examiner* — Vivian C Chin

(74) *Attorney, Agent, or Firm* — Rankin, Hill & Clark LLP

(57) ABSTRACT

Provided is an audio device for performing control related to a separation process of separating audio data of a music piece into multiple parts, the multiple parts being included in the music piece, the audio device including: a display controlling module configured to cause a display to display labels representing the respective multiple parts; an operation acquiring module configured to acquire information indicating a user operation of selecting at least a portion of the labels; and a selecting module configured to select at least one part included in the multiple parts based on the information indicating the user operation.

4 Claims, 8 Drawing Sheets

(56) References Cited

OTHER PUBLICATIONS

Translation of “Development of “MuSep”, an application for supporting ear-copying and improvisation practice using sound source separation”, IPSJ Interaction 2021, pp. 211-215, Mar. 10, 2021, Internet: https://www.interaction-ipsj.org/proceedings/2021/data/pdf/1B06.pdf (from IDS filed Nov. 22, 2023) (Year: 2021).*
International Preliminary Report on Patentability dated Nov. 21, 2023, Application No. PCT/JP2021/020240; 4 pages.
International Search Report dated Aug. 3, 2023, Application No. PCT/JP2021/020240; 4 pages.
Algoriddim GmbH, “Djay Neural Mix”, application introduction website https://www.algoriddim.com/neural-mix; discussed in the specification, 13 pages.
Kuno, et al. “Development of ‘Musep’, an application that assists in learning by ear and practicing ad-libbing using audio source separation.” [Online], IPSJ Interaction 2021, Mar. 10, 2021, pp. 211-215, Internet: <URL : https://www.interaction ipsj.org/proceedings/2021/data/pdf/1B06.pdf; Cited in the ISR; English abstract included.
Japanese Office Action dated May 20, 2025, issued in corresponding Japanese Application No. 2023-523869; English translation included; 6 pages.

* cited by examiner

SOUND DEVICE, PROGRAM, AND CONTROL METHOD

TECHNICAL FIELD

The present invention relates to an audio device, a program, and a control method.

BACKGROUND ART

Various techniques have recently been considered for audio devices and applications related to DAW (Digital Audio Workstation) and DTM (Desk Top Music). For example, Non-Patent Literature 1 discloses an application that makes it possible to execute ex-post sound separation on a computer.

CITATION LIST

Non-Patent Literature(s)

Non-Patent Literature 1: Djay Neural Mix (Algoriddim GmbH), application introduction website (https://www.algoriddim.com/neural-mix)

SUMMARY OF THE INVENTION

Problem(s) to be Solved by the Invention

However, an actual use of the above-described technique has still not been sufficiently proposed yet.

Therefore, an object of the invention is to provide, regarding an audio device that performs control related to a separation process, an audio device, a program, and a control method that make it possible to achieve high operability and flexibility.

Means for Solving the Problem(s)

[1] An audio device for performing control related to a separation process of separating audio data of a music piece into multiple parts, the multiple parts being included in the music piece, the audio device including: a display controlling module configured to cause a display to display labels representing the respective multiple parts; an operation acquiring module configured to acquire information indicating a user operation of selecting at least a portion of the labels; and a selecting module configured to select at least one part included in the multiple parts based on the information indicating the user operation.

[2] The audio device according to [1], in which the multiple parts include candidates for parts into which the audio data of the music piece is separable in the separation process that has not been executed, and the audio device further includes an outputting module configured to output information indicating the at least one part selected by the selecting module to a device configured to execute the separation process.

[3] The audio device according to [1], in which the multiple parts include a part whose audio data of the music piece has been separated in the separation process that has been executed, the operation acquiring module further acquires information indicating a user operation of inputting a label representing at least a portion of the multiple parts, and the audio device further includes an outputting module configured to output the label that has been inputted, together with information identifying a part associated with the label, to a device configured to hold a result of the separation process.

[4] The audio device according to [3], in which the multiple parts include a first part whose audio data of the music piece has been separated in the separation process that has been executed and a second part whose audio data of the music piece has not been separated in the separation process, and the display controlling module causes the display to display a label representing the first part and a label representing the second part in different expressions.

[5] A program configured to cause a computer to operate as the audio device according to any one of [1] to [4]

[6] A control method to be executed by an audio device for performing control related to a separation process of separating audio data of a music piece into multiple parts, the multiple parts being included in the music piece, the control method including: causing a display to display labels representing the respective multiple parts; acquiring information indicating a user operation of selecting at least a portion of the labels; and selecting at least one part included in the multiple parts based on the information indicating the user operation.

DESCRIPTION OF EMBODIMENT(S)

The following describes preferred exemplary embodiments of the invention in detail with reference to the accompanying drawings. It is to be noted that, in this description and the accompanying drawings, components that have substantially the same functional configuration are indicated by the same reference signs, and thus redundant description thereof is omitted.

Figure 1:
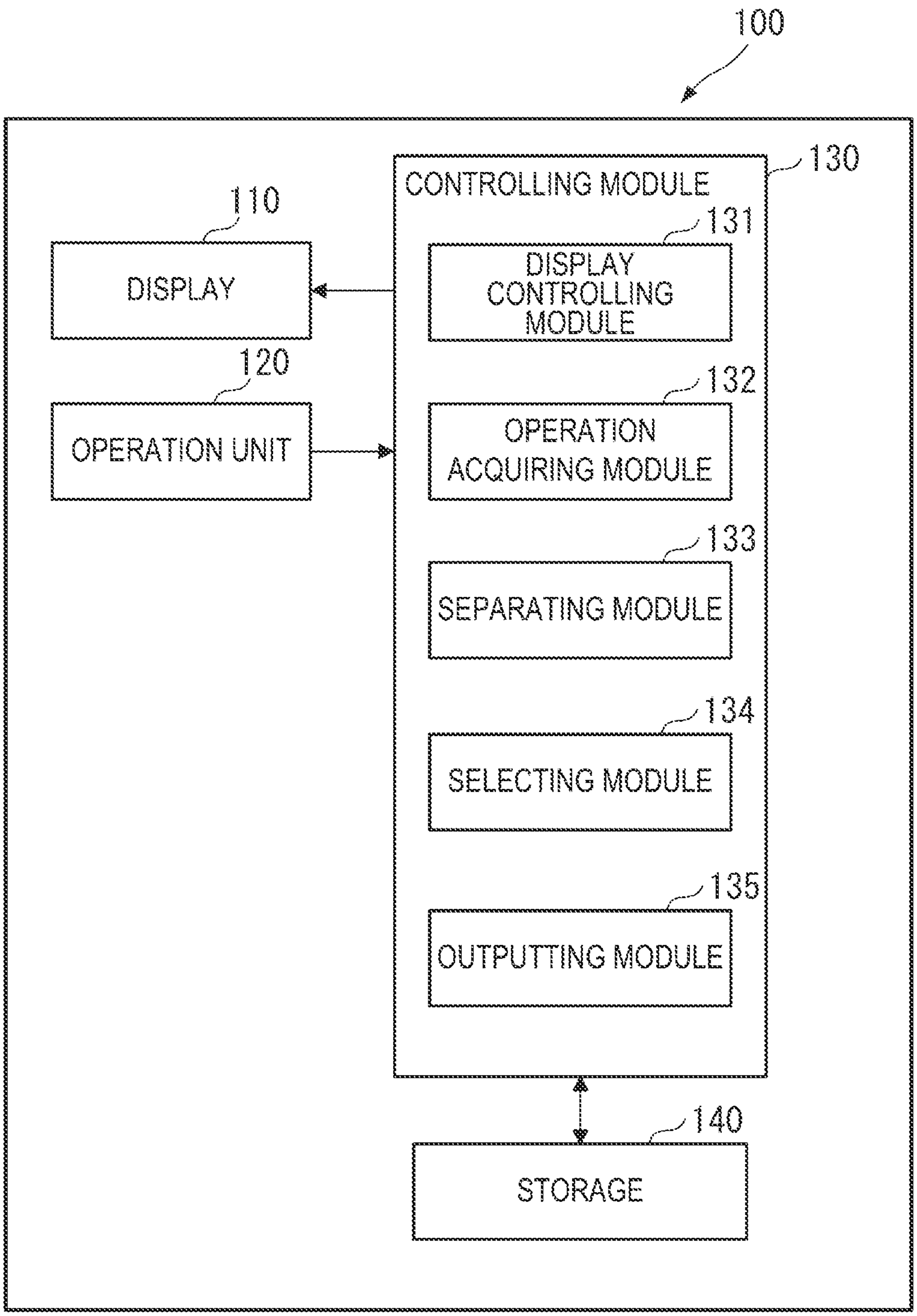
FIG. 1 is a block diagram illustrating a schematic functional configuration of an audio device according to one exemplary embodiment of the invention.

FIG. 1 is a block diagram illustrating a schematic functional configuration of an audio device according to an exemplary embodiment of the invention. The audio device according to the exemplary embodiment of the invention includes a computer.

As illustrated in FIG. 1, an audio device 100 includes a display 110, an operation unit 120, a controlling module 130, and a storage 140. Functions of the respective components described above are implemented, for example, by a processor operating in accordance with a program in the audio device having a computer hardware configuration. Hereinafter, the functions of the respective components will be further described.

The display 110 is a display device that displays a screen including various pieces of information in the audio device 100 and an operator for receiving a user operation. Various types of display devices are employable as the display 110, examples of which include a liquid crystal display device and an organic EL display device.

The operation unit 120 includes an input device such as a keyboard or a mouse.

The controlling module 130 is implemented in the audio device 100 by a processor such as a communication interface or a CPU (Central Processing Unit) and a memory serving as a work area, and controls an operation of the audio device 100. The controlling module 130 includes a display controlling module 131, an operation acquiring module 132, a separating module 133, a selecting module 134, and an outputting module 135 that are implemented by a processor operating in accordance with a program stored in a memory or received via a communication interface.

The display controlling module 131 causes the display 110 to display a screen including information of audio data of a music piece related to the audio device 100, and a GUI (Graphical User Interface) for receiving the user operation related to a setting and control with respect to the audio data.

The operation acquiring module 132 acquires information indicating the user operation based on the user operation via the operation unit 120. Thereafter, the operation acquiring module 132 supplies the information indicating the user operation to each of the components in the controlling module 130.

The separating module 133 executes a separation process of separating the audio data of the music piece into multiple parts that are included in the music piece. The multiple parts into which the audio data is to be separated each correspond to the corresponding one of sounds for respective parts of the music piece to be played based on the audio data. Here, each of the parts corresponds to, for example, a sound of a vocal or a musical instrument.

Figure 2:
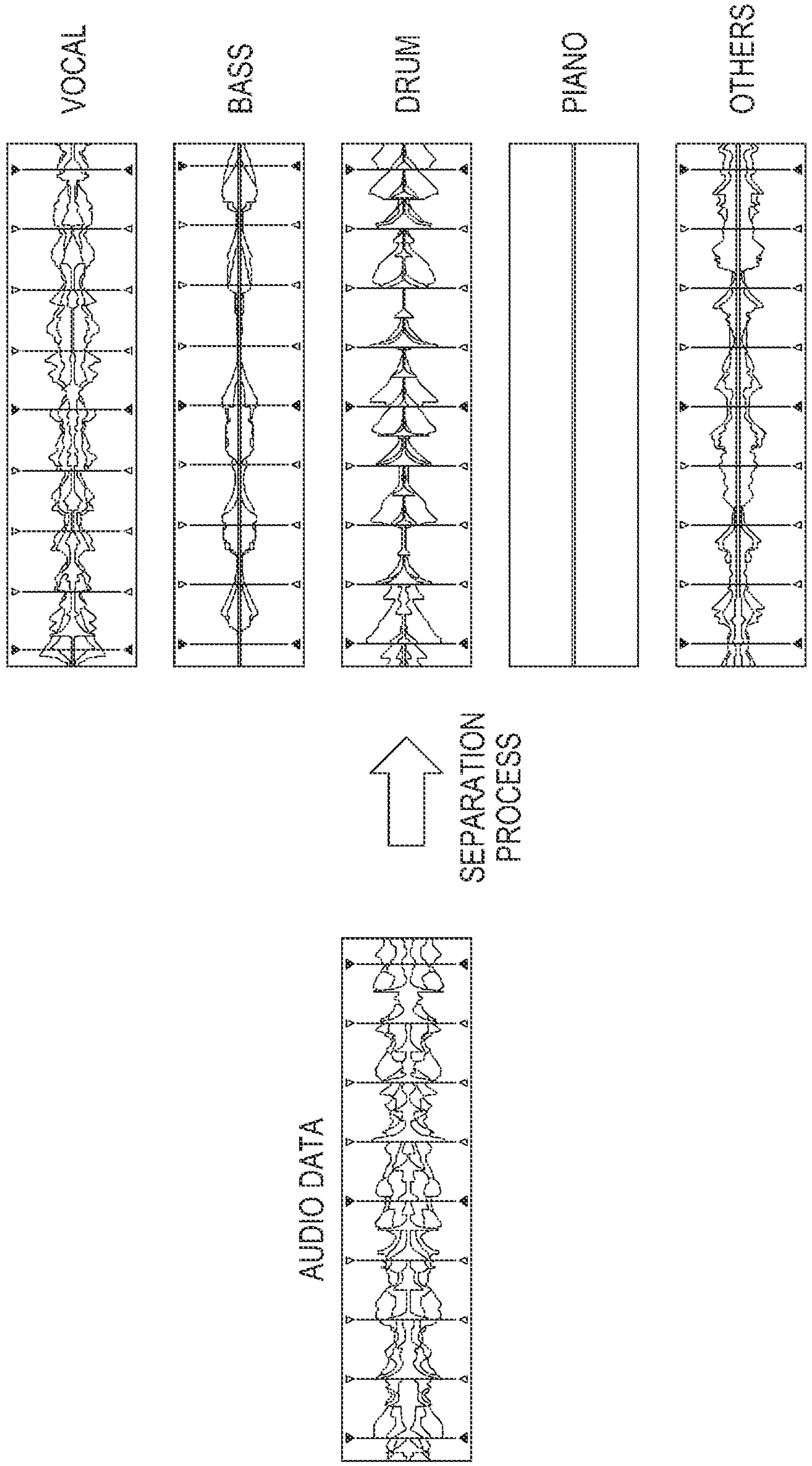
FIG. 2 is a diagram illustrating an example of a separation process according to one exemplary embodiment of the invention.

FIG. 2 is a diagram illustrating an example of the separation process. FIG. 2 illustrates an example in which the separation process is performed on the audio data, and the audio data is separated into five parts, i.e., the vocal, a bass, a drum, a piano, and others. In the example of FIG. 2, the piano sound part is a part that has not been separated and no data is present.

In addition to the above-described example, the part may be further subdivided and separated for each kind of musical instrument, for example, the drum part may be subdivided and separated into a bass drum part, a snare drum part, and a hi-hat part. In this case, a direct separation process may be executed, from the audio data of the music piece of a separation target into the bass drum part, the snare drum part, and the hi-hat part, or a stepwise separation process may be executed in which the drum part is subjected to music separation to thereby be separated stepwise into the bass drum part, the snare drum part, and the hi-hat part. In both cases, the parts of the music piece include a part obtained by subjecting each of the parts included in the music piece to the music separation, for example, one portion of a part that configures a part of a musical instrument and that is obtained by further subdividing each of the parts included in the music piece. Various known techniques are available for such a separation process of performing separation into multiple parts, and thus detailed explanation thereof is omitted.

It is to be noted that the audio device 100 may include a communication interface, and may be configured to execute the separation process by an external audio device, a computer, etc., or may be configured to acquire, via the unillustrated communication interface, the audio data that has been subjected to the separation process by the external audio device, the computer, etc., and to store the audio data in the storage 140. In this case, the audio device 100 does not include the device (the separating module 133) that executes the separation process, and the external audio device and the computer each operate as the device (the separating module 133) that executes the separation process.

The selecting module 134 selects at least one part included in the above-described multiple parts based on information indicating the user operation. Thereafter, the selecting module 134 supplies information indicating a selection result to each component included in the controlling module 130.

The outputting module 135 outputs information to the storage 140 and an outside of the audio device 100. A specific process performed by the outputting module 135 will be described later.

The storage 140 is configured to store the audio data of the music piece with use of, for example an HDD (Hard Disk Drive) and a flash memory. The storage 140 stores the audio data of multiple music pieces in a predetermined format such as a MP3 format. The audio data includes, in addition to audio information, information of, for example, BPM, an artwork, a title, an artist name, an album name, a key, a DJ play count, and a genre of the music piece as tag information. The audio data to be stored in the storage 140 is associated with a time stamp that is information of a play position. Further, the storage 140 also operates as a device for holding a result of the separation process. The holding of the result of the separation process will be described later.

It is to be noted that the audio device 100 may include a communication interface, and may be configured to acquire the audio data stored in an external storage device, a computer, etc., via the unillustrated communication interface and store the audio data in the storage 140. In this case, the audio device 100 does not include the storage 140, and the external storage device operates as the storage 140.

A description is given of a display screen to be displayed on the display 110 when the user performs control related to the separation process on the above-described audio device 100.

(1) Control Before Separation Process

For control before the separation process, the display controlling module 131 of the audio device 100 causes the display 110 to display labels representing candidates for parts into which the audio data of the music piece is separable in the separation process that has not been executed, and the operation acquiring module 132 acquires information indicating the user operation of selecting at least a portion of the labels displayed on the display 110.

Figure 3:
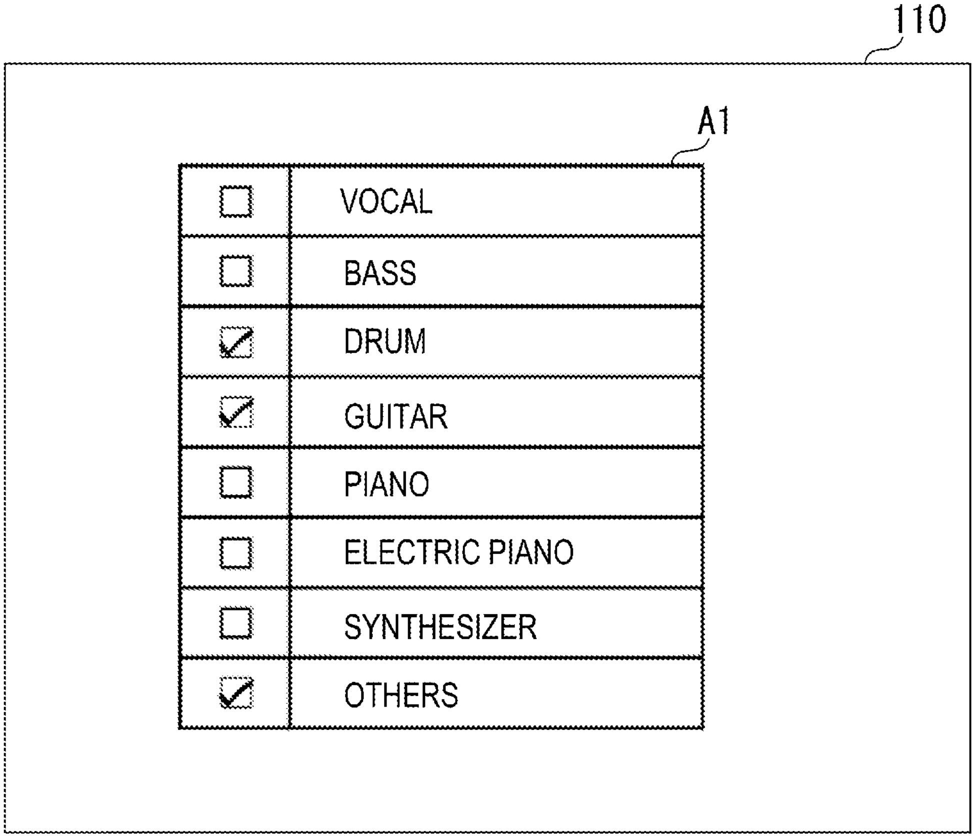
FIG. 3 is a diagram illustrating an example of a display screen according to one exemplary embodiment of the invention.
Figure 4:
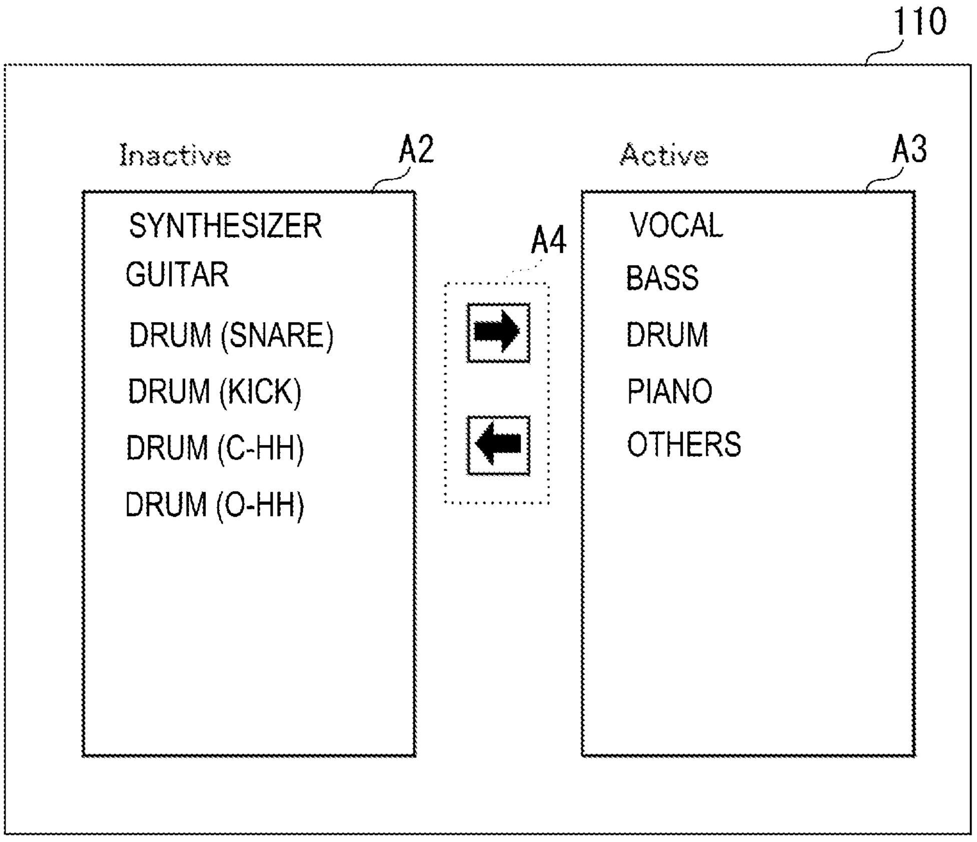
FIG. 4 is a diagram illustrating another example of the display screen according to one exemplary embodiment of the invention.

FIGS. 3 and 4 are each a diagram illustrating an example of the display screen according to the exemplary embodiment.

As illustrated in FIG. 3, the display controlling module 131 displays, on a display area A1 of the display 110, a list representing the candidates for the parts into which the audio data of the music piece is separable in the separation process. FIG. 3 illustrates the example of the list of texts representing kinds of the parts, and checkboxes. In the example of FIG. 3, the parts of the drum, a guitar, and others are checked.

It is to be noted that the texts representing the kinds of the parts are the labels identifying the candidates for the parts into which the audio data of the music piece is separable, and the operation acquiring module 132 acquires the presence or absence of a check in each of the checkboxes of the respective parts as the information indicating the user operation.

The user performs an operation via the operation unit 120 based on the information displayed on the display 110, which makes it possible to select a part that the user wants to separate by the separation process before the separation process.

FIG. 4 is a modification of FIG. 3. As illustrated in FIG. 4, the display controlling module 131 may display separately, in a display area A2 and a display area A3 of the display 110, lists each representing the candidates for the parts into which the audio data of the music piece is separable in the separation process. In the example of FIG. 4, the display area A2 displays parts to be separated by the separation process, the display area A3 displays parts not to be separated by the separation process, and a display area A4 displays operators for moving the parts between the display area A2 and the display area A3.

The user performs the operation via the operation unit 120 based on the information displayed on the display 110, which makes it possible to, before the separation process, divide the parts into parts that the user wants to separate by the separation process and other parts.

As described above, the display controlling module 131 causes the display 110 to display the labels representing the candidates for the parts into which the audio data of the music piece is separable in the separation process that has not been executed, and the operation acquiring module 132 acquires information indicating the user operation of selecting at least a portion of the labels displayed on the display 110.

The selecting module 134 selects at least one part from the candidates for the parts into which the audio data of the music piece is separable in the separation process based on the information indicating the user operation acquired by the operation acquiring module 132. Thereafter, the separating module 133 executes the separation process for the part selected by the selecting module 134.

As described above, when the audio device 100 does not include the separating module 133 and the external audio device or the computer, for example, executes the separation process, the outputting module 135 outputs the information indicating the part selected by the selecting module 134 to the external audio device or the computer that executes the separation process.

Next, operations of the respective components during the control before the separation process will be described.

Figure 5:
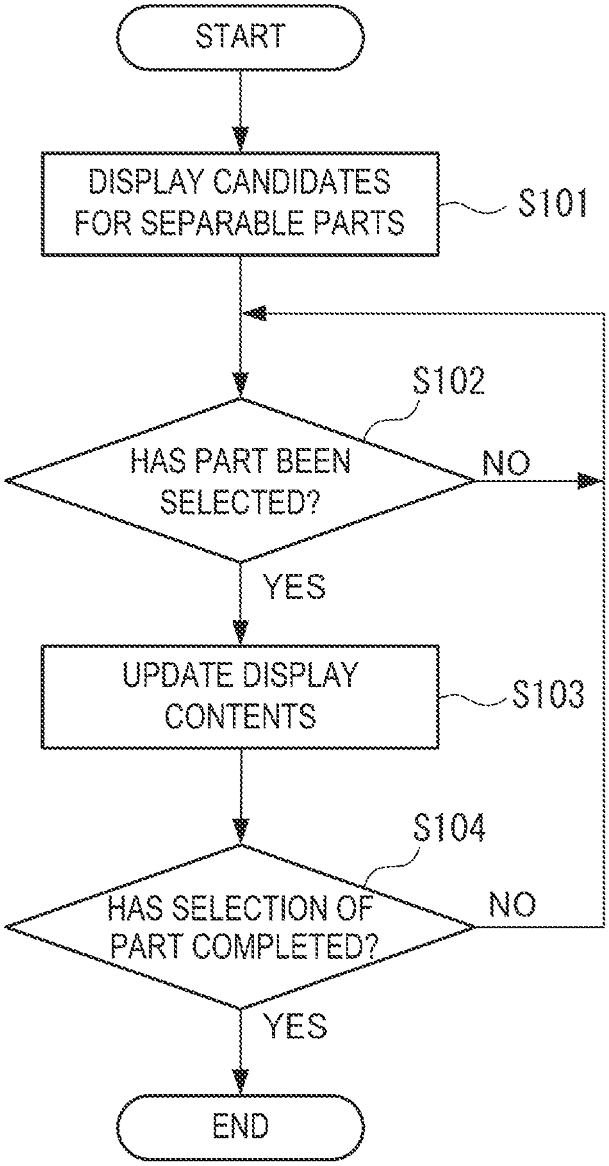
FIG. 5 is a flowchart illustrating a control method according to one exemplary embodiment of the invention.

FIG. 5 is a flowchart illustrating the operations of the respective components during the control before the separation process.

In the example illustrated in FIG. 5, first, the display controlling module 131 causes the display 110 to display the candidates for the parts into which the audio data of the music piece is separable in the separation process (Step S101). Thereafter, the operation acquiring module 132 determines whether or not the user operation of selecting the part via the operation unit 120 has been performed (Step S102).

If the operation acquiring module 132 determines that the user operation of selecting the part has been performed (Step S102: YES), the display controlling module 131 updates display contents of the display 110 (Step S103).

The audio device 100 repeats Step S102 and Step S103 until the selection of the part is completed (Step S104: YES).

As described above, the display controlling module 131 of the audio device 100 causes the display 110 to display the labels representing the candidates for the parts into which the audio data of the music piece is separable in the separation process, and the operation acquiring module 132 acquires the information indicating the user operation of selecting at least a portion of the labels. Thereafter, based on the acquired user operation, the selecting module 134 selects at least one part, and the separating module 133 executes the separation process for the selected part. Conventionally, all parts have been subjects of the separation process, for example, the piano sound part has been a subject of the separation process for the audio data in which no piano sound part exists. However, according to the audio device 100 of the exemplary embodiment, it is possible to improve flexibility of a setting of the separation process. It is therefore possible to select a part based on a characteristic of the audio data to be subjected to the separation process, or to select a part based on demand of the user.

(2) Control After Separation Process

For control after the separation process, the display controlling module 131 of the audio device 100 causes the display 110 to display labels representing parts whose audio data of the music piece has been separated in the separation process executed by the separating module 133.

FIGS. 6A, 6B, 7A, and 7B are each a diagram illustrating an example of a display screen of the exemplary embodiment.

Figure 6A:
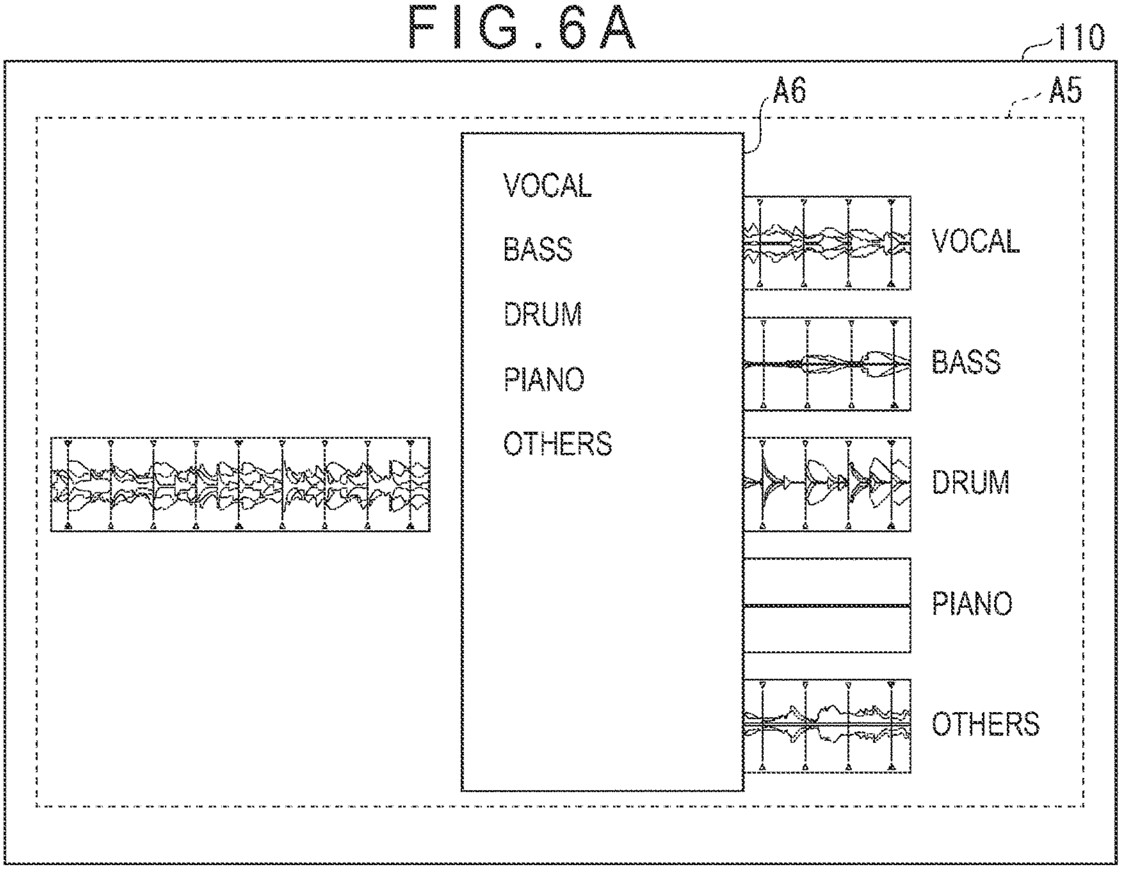
FIG. 6A is a diagram illustrating another example of the display screen according to one exemplary embodiment of the invention.
Figure 6B:
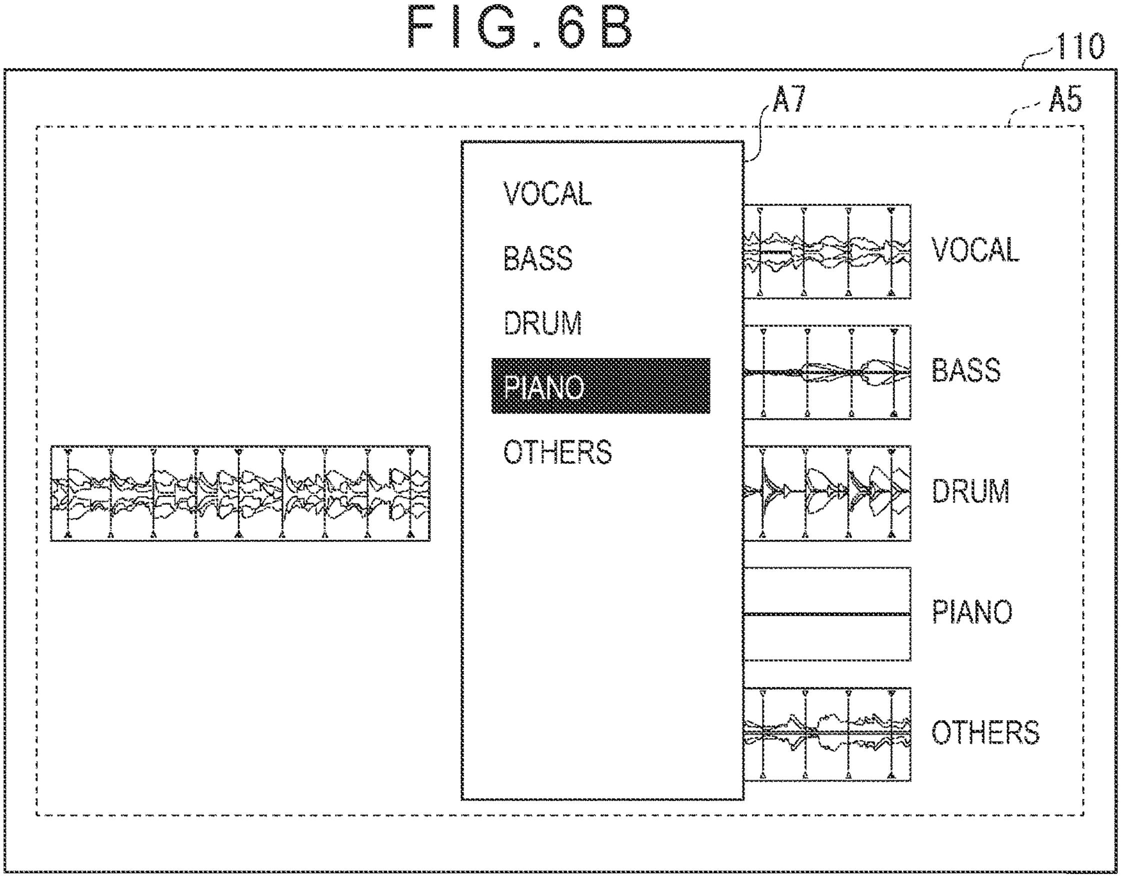
FIG. 6B is a diagram illustrating another example of the display screen according to one exemplary embodiment of the invention.

As illustrated in FIG. 6A, the display controlling module 131 displays waveforms indicating separation results in a display area A5 of the display 110, and displays, in a display area A6 superimposed on the display area A5, a list representing the parts whose audio data of the music piece has been separated in the separation process executed by the separating module 133. FIG. 6A illustrates the example in which a list of texts representing kinds of the parts is displayed in the display area A6. The texts representing the kinds of the parts are the labels identifying the parts whose audio data of the music piece has been separated in the separation process that has been executed.

In the separation process, when there are a part whose audio data of the music piece has been separated and a part whose audio data of the music piece has not been separated, the display controlling module 131 causes the display 110 to display a label representing the part whose audio data of the music piece has been separated and a label representing the part whose audio data of the music piece has not been separated in different expressions. For example, when the piano sound part has not been separated, as illustrated in a display area A7 of FIG. 6B, the label representing the piano sound part whose audio data of the music piece has not been separated is displayed in one of black or white that is inverted with respect to the other labels. Further, for example, the label representing the part whose audio data of the music piece has not been separated may be grayed out and displayed, or may be hidden, or a message such as "no separation result" may be displayed. Such displays make it possible for the user to easily distinguish the part whose audio data of the music piece has been separated from the part whose audio data of the music piece has not been separated.

It is possible to determine whether it is the part whose audio data of the music piece has been separated or the part whose audio data of the music piece has not been separated based on whether or not the result obtained by the separation performed by the separating module 133 includes the audio data for each part.

As described above, it is possible to check the result of the separation process by causing the display 110 to display the label representing the part whose audio data of the music piece has been separated in the separation process; however, it is also possible to edit the above-described label on the audio device 100.

The display controlling module 131 of the audio device 100 causes the display 110 to display a screen for receiving a user operation of inputting a label for any of the labels displayed as the results of the separation process, and the operation acquiring module 132 acquires information indicating the user operation of selecting or inputting the label.

Figure 7A:
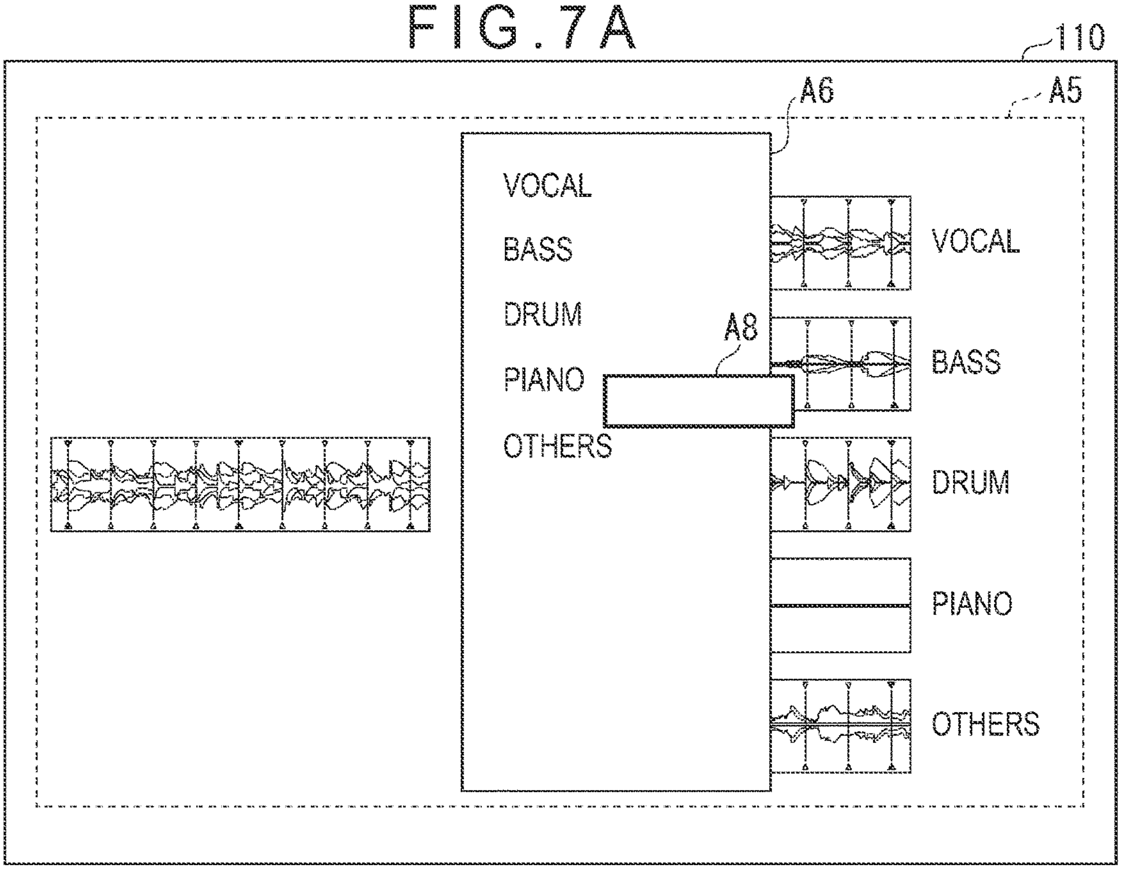
FIG. 7A is a diagram illustrating another example of the display screen according to one exemplary embodiment of the invention.

As illustrated in FIG. 7A, as with FIG. 6A, the display controlling module 131 displays the waveforms indicating the separation results in the display area A5 of the display 110, displays the list representing the parts whose audio data of the music piece has been separated in the display area A6, and displays, in a display area A8 superimposed on the display area A6, a text box in which a label is to be inputted.

The user selects any part by performing an operation on the list via the operation unit 120, and inputs a label of the selected part by performing an operation on the text box via the operation unit 120. For example, if the piano sound part has been separated in the separation process, but it has turned out to be a guitar sound part according to a sensibility evaluation of the user, in other words, if the guitar sound part has erroneously been separated as the piano sound part, it is possible for the user to correct the label of the piano sound part to the guitar sound part.

Figure 7B:
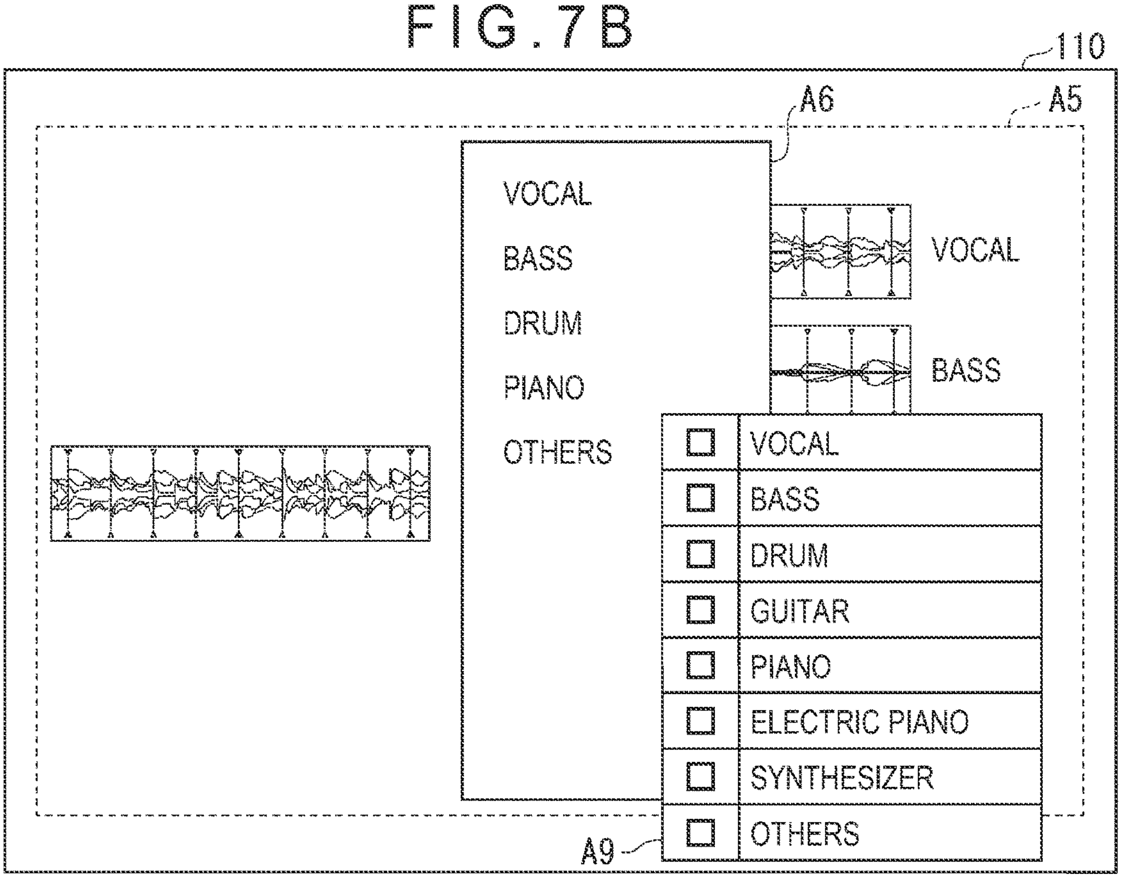
FIG. 7B is a diagram illustrating another example of the display screen according to one exemplary embodiment of the invention.

FIG. 7B is a modification of FIG. 7A. As illustrated in FIG. 7B, the display controlling module 131 may display a selection box for changing the label in a display area A9 superimposed on the display area A6 of the display 110.

It is possible for the user to select a correct label from the selection box displayed on the display 110 by performing the operation via the operation unit 120.

It is to be noted that the respective displays described by referring to FIGS. 6A, 6B, 7A, and 7B may be configured to set the presence or absence of the display by user. For example, in the examples illustrated FIGS. 7A and 7B, when any of the parts is selected from the list displayed in the display area A6, a display (the display area A8 or the display area A9) related to the inputting of the label of the part may be displayed.

Further, FIGS. 6A, 6B, 7A, and 7B each illustrate an example in which the texts (vocal, bass, etc.) representing the kinds of the parts are displayed in the display area A6 or the display area A7 as the labels identifying the parts whose audio data of the music piece has been separated; however, a configuration may be adopted in which it is possible for the user to newly input the label for a portion of or all of the parts. Such a configuration is useful, for example, when the kind of the any part that has been separated is unclear.

Next, operations of the respective components during the control after the separation process will be described.

Figure 8:
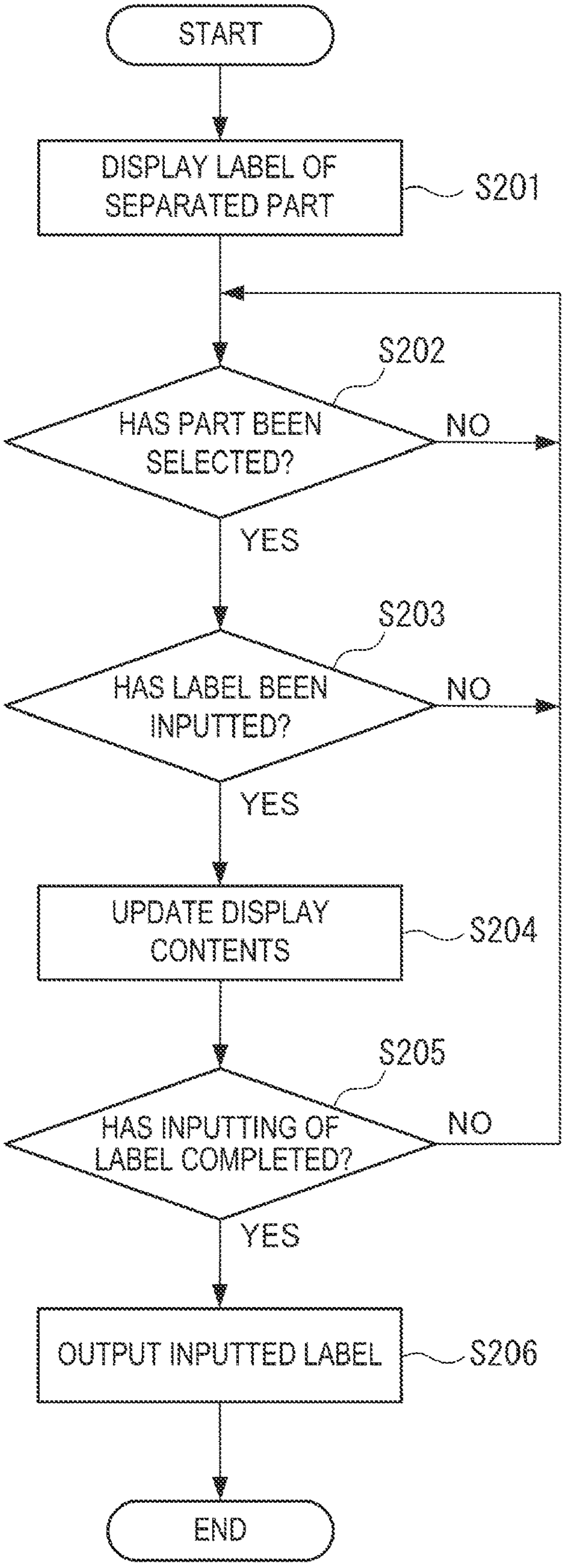
FIG. 8 is another flowchart illustrating the control method according to one exemplary embodiment of the invention.

FIG. 8 is a flowchart illustrating the operations of the respective components during the control after the separation process.

In the example illustrated in FIG. 8, first, the display controlling module 131 causes the display 110 to display the part whose audio data of the music piece has been separated in the separation process executed by the separating module 133 (Step S201). Thereafter, the operation acquiring module 132 determines whether or not the user operation of selecting the part via the operation unit 120 has been performed (Step S202).

If the operation acquiring module 132 determines that the user operation of selecting the part has been performed (Step S202: YES), the operation acquiring module 132 determines whether the user operation of inputting the label via the operation unit 120 has been performed (Step S203).

If the operation acquiring module 132 determines that the user operation of inputting the label has been performed (Step S203: YES), the display controlling module 131 updates the display contents of the display 110 (Step S204).

The audio device 100 repeats the process from Step S202 to Step S204 until the inputting of the label is completed (Step S205: YES). When the inputting of the label is completed (Step S205: YES), the outputting module 135 outputs the inputted label to the storage 140 together with information identifying a part associated with the label (Step S206).

As described above, the display controlling module 131 of the audio device 100 causes the display 110 to display the labels representing the parts whose audio data of the music piece has been separated in the separation process that has been executed, and the operation acquiring module 132 acquires the information indicating the user operation of selecting and inputting the label. Thereafter, based on the acquired information indicating the user operation, the selecting module 134 selects at least one part, and outputs the inputted label to the storage 140 together with the information identifying the part associated with the label. Accordingly, it is possible to edit the result of the separation process based on the user operation. It is therefore possible to bring the result of the separation process closer to a realistic situation, and to improve accuracy of the separation process.

(3) Application of Control to Other Processes

The result of the label inputting described in (2) may be applied to other control in the audio device 100.

For example, when a parameter setting of a filter or an effect is to be performed for each part that has been separated by the separation process, the label of each part upon setting the parameter may be dynamically changed based on the result of the label inputting described in (2).

Further, for example, when various types of editing of the music piece based on the part that has been separated by the separation process are to be performed, the label of each part upon editing may be dynamically changed based on the result of the label inputting described in (2). Such control may also be useful, for example, in performing editing such as muting any part or replacing any part with a different instrument part.

Further, upon performing another process, the label representing the part whose audio data of the music piece has been separated and the label representing the part whose audio data of the music piece has not been separated may be displayed in different expressions.

According to an exemplary embodiment of the invention described above, the labels representing the multiple parts are displayed on the display, the information indicating the user operation of selecting at least a portion of the labels is acquired, and at least one part included in the multiple parts is selected based on the information indicating the user operation. It is therefore possible to achieve high operability and flexibility by performing an easy-to-understand display for the user on the audio device that performs the control related to the separation process.

Further, according to an exemplary embodiment of the invention, the multiple parts include the candidates for the parts into which the audio data of the music piece is separable in the separation process that has not been executed, and the information indicating at least one part that has been selected is outputted to the device that executes the separation process. It is therefore possible to improve the flexibility of the setting of the separation process.

Further, according to an exemplary embodiment of the invention, the multiple parts include the parts whose audio data of the music piece has been separated in the separation process that has been executed. In addition, the information indicating the user operation of inputting the label representing at least a portion of the multiple parts is further acquired, and the inputted label is outputted, together with the information identifying the part associated with the label, to the device that holds the result of the separation process. This makes it possible to edit the result of the separation process based on the user operation.

Further, according to an exemplary embodiment of the invention, the part whose audio data of the music piece has been separated in the separation process that has been executed (i.e., a first part) and the part whose audio data of the music piece has not been separated in the separation process (i.e., a second part) are included, and the labels representing the respective parts are displayed in different expressions. It is therefore possible to perform an easy-to-understand display for the user.

It is to be noted that the separation process described in the above-described exemplary embodiment may be executed in units of music piece or may be executed for a portion of the music piece. For example, a known music analysis process may be performed, and the separation process may be performed for each segment based on development of the music piece. In this case, for the control before the separation process described in (1), the setting of the separation process may be performed for each segment. Further, for the control after the separation process described in (2), the editing of the result of the separation process may be performed for each segment. Such configurations make it possible to perform more detailed control related to the separation process.

Further, the display screens described in the above-described exemplary embodiment are each an example, and the respective elements, designs, arrangements, etc. thereof are not limited to the exemplary embodiment. For example, the label identifying the part may be an illustration rather than the text, or may be a combination of the illustration and the text. Further, the respective elements, designs, arrangements, etc. of the display screens may be settable by the user.

Further, in the above-described exemplary embodiment, the controlling module 130 of the audio device 100 performs the above-described process by reading a program from an unillustrated storage and an unillustrated recording medium and executing the program. However, the invention is not limited thereto, and for example, the controlling module 130 may acquire a program from a device on a network and execute the program. Examples of the recording medium include a disk-type recording medium, an HDD, and a semiconductor memory.

Further, the audio device having the above-described functions is not limited to the examples of the above-described exemplary embodiment, and may be, for example, a mixer or a DJ controller having a mixer function. Still further, the invention may be applied not only to a DJ device and a DJ application, but also to a music application, a streaming service using the Internet, for example. Moreover, the invention may also be applicable to an electronic musical instrument, as well as an audio device such as DAW (Digital Audio Workstation) or DTM (Desk Top Music).

Preferred exemplary embodiments of the invention have been described above in detail with reference to the accompanying drawings, but the invention is not limited to such exemplary embodiments. It is apparent that a person having ordinary skill in the art of the invention can arrive at various alterations and modifications within the scope of the technical idea defined by the appended claims, and it is understood that such alterations and modifications naturally fall within the technical scope of the invention.

The invention claimed is:

1. An audio device for performing control related to a separation process of separating audio data of a music piece into multiple parts, the multiple parts being comprised in the music piece, the audio device comprising a processor that is configured to:

cause a display to display labels representing the respective multiple parts separated in the separation process;

acquire information indicating a user operation of selecting at least a portion of the labels and editing the at least the portion of the labels selected; and output, to a device configured to hold a result of the separation process, the at least the portion of the labels that has been edited by the user operation, together with information identifying a part associated with the at least the portion of the labels that has been edited, of the multiple parts.

2. The audio device according to claim 1, wherein the multiple parts comprise a first part whose audio data of the music piece has been separated in the separation process that has been executed and a second part whose audio data of the music piece has not been separated in the separation process, and the processor is configured to cause the display to display a label representing the first part and a label representing the second part in different expressions.

3. A non-transitory computer-readable storage medium storing a program configured to cause a computer to operate as the audio device according to claim 1.

4. A control method to be executed by an audio device for performing control related to a separation process of separating audio data of a music piece into multiple parts, the multiple parts being comprised in the music piece, the control method comprising:

causing a display to display labels representing the respective multiple parts separated in the separation process;

acquiring information indicating a user operation of selecting at least a portion of the labels and editing the at least the portion of the labels selected; and outputting, to a device configured to hold a result of the separation process, the at least the portion of the labels that has been edited by the user operation, together with information identifying a part associated with the at least the portion of the labels that has been edited, of the multiple parts.

* * * * *